United States Patent Office 3,519,546
Patented July 7, 1970

3,519,546
METHOD OF INCREASING THE ACTIVITY OF A CATALYST IN THE OXIDATION OF CARBON MONOXIDE
Vin Jang Lee, Rocheport, Mo.
(408 Edgewood, Columbia, Mo. 65201)
No Drawing. Filed Mar. 6, 1967, Ser. No. 620,646
Int. Cl. C01b 31/20
U.S. Cl. 204—164                          8 Claims

ABSTRACT OF THE DISCLOSURE

A time varying electric field is applied to the surface of a carbon monoxide oxidation catalyst. The electric field is applied to the surface of the catalyst, which promotes the formation of reactive intermediates such as adion or other active species on or near the catalytic surface; then the direction of the field is reversed to promote deionization and desorption of the products. The frequency of the electric field is adjusted so that it is in resonance with the staying time of the chemical product on the catalytic surface.

METHOD OF INCREASING THE ACTIVITY OF HETEROGENEOUS CATALYSTS

This invention relates to a method of enhancing the activity of a solid catalyst by imposing a time varying electric field to its surface when it is in contact with either liquid or gaseous chemical reactants.

In producing chemicals, many attempts have been made to increase the rates of the chemical reactions. One of the methods ordinarily used to increase the reaction rate is to place the chemical reactants in contact with one or more solid catalysts. It has now been discovered that the catalytic activity of a solid catalyst can be further enhanced by imposing a time varying electric field (i.e., an electrodynamic field) on its surface, thereby increasing the reaction rates of the reactants. It has also been discovered that great economies in the manufacture of chemicals can be achieved by the use of this process.

This invention has as a broad object, the increase in the reaction rates of chemical reactants by applying the electrodynamic field effect to a heterogeneous catalyst.

This invention has as another object, the increase in the rate of chemical reactions in which one of the reactants is either hydrogen or oxygen.

This invention has as a further object, the increase in the rate of the oxidation of carbon monoxide when air is used as one of the reactants.

This invention has as still another object, the increase of the rate of hydrogenation of benzene to form cyclohexane.

These objects are accomplished by the following invention, wherein an electrodynamic field is applied to a solid catalyst, thereby increasing its activity and thus the reaction rates of the reactants in contact with the catalyst. An electric field of one polarity is applied to the surface of the catalyst to promote the fomation of reactive intermediates such as adions or other active species on or near the catalytic surface; then the direction of the field is reversed to promote deionization and desorption of the products. The frequency of the electrodynamic field is so adjusted that it is in resonance with the staying time of the chemical product on the catalytic surface. The ionization and deionization time of the charge transfer mechanism is a function of, among other things, the catalyst used and the reactants in contact with the catalyst.

In the practice of my process, I have used both sinusoidal and square wave electrodynamic fields. I have found that under identical pressure and temperature conditions, the optimum increases of the rate of chemical reactions is a function of both the intensity and the frequency of the electrical field for a given catalyst and specific reactants.

The solid catalyst referred to in this invention includes all types such as metals, semiconductors and dielectrics. The solid catalyst can be arranged as one or a series of capacitor type surfaces or can be in the form of a packed bed of particles between two capacitor type electrodes.

It will be obvious from a consideration of the previous discussion that an electrodynamic field other than the sinusoidal or square wave type may be applied to a solid catalyst to achieve an increase in the activity of the catalyst.

A more detailed practice of my invention is illustrated by the following examples. There are, of course, many forms of the invention other than these specific embodiments.

EXAMPLE I

This example illustrates the reaction of carbon monoxide and oxygen in the presence of nickel oxide as a catalyst to obtain carbon dioxide.

The oxidation of carbon monoxide was studied in a static reactor containing 20 plates of grade-A nickel, 5.08 centimeters in diameter, oxidized by controlled oxidation to a thickness of about one micron of NiO. The plates were separated by ceramic spacers which were rings of one millimeter thickness. An alternating electrical field of 22,000 volts per centimeter peak to peak, was applied between the plates. At frequencies ranging from 50 to 300 cycles per second, the field consisted of a smooth sine wave. The reactor was totally enclosed in a thermostat controlled at $123 \pm 1°$ C. The reactant gases, air and CO, had been dried by passage through drying tubes containing 5A molecular sieve of 30 mesh; they were mixed before entering the reactor. The feed contained 0.028 percent CO by volume; the balance was air. After purge of the reactor for four hours at a flow rate of 96 cubic centimeters per minute, the reactant mixture was trapped in the reactor at a pressure of 12.5 centimeters of water above atmospheric pressure.

Compositions of CO and air were determined by measurements of flow rates with two calibrated Matheson-610 flow meters. After a reaction period of from 19 to 68 hours, the resultant gaseous mixture was analyzed for $CO_2$ content by a gas chromatograph using a silica gel column; the area under the gas-chromatographic curve was determined with a planimeter, with an estimated possible error of up to 0.01 percent (by volume) $CO_2$. The following Table 1, summarizes the data:

TABLE 1.—OXIDATIONS OF CO TO $CO_2$ DURING EIGHT RUNS, PP, PEAK TO PEAK

| Run | Duration (hr.) | Field, PP (volts/cm.) | Frequency cy./sec.) | $CO_2$ (vol. percent) | |
|---|---|---|---|---|---|
| | | | | In residue | Net conversion |
| 4/5 | 67 | None | | 0.168 | 0.140 |
| 4/6 | 19 | None | | 0.060 | .032 |
| 4/7 | 19 | 22,000 | 50 | .195 | .167 |
| 4/8 | 19 | 22,000 | 100 | .230 | .202 |
| 4/9 | 19 | 22,000 | 200 | .215 | .186 |
| 4/12 | 68 | None | | .175 | .147 |
| 4/13 | 19 | 22,000 | 300 | .138 | .110 |
| 4/14 | 19 | 22,000 | 400 | [1] .138 | .110 |

[1] Wave form contained high-frequency distortions.

The above description and example are intended to be illustrative only. Any modification of or variation therefrom which conforms to the spirit of the invention is intended to be included within the scope of the claims.

EXAMPLE II

The second example illustrates the electrodynamic field effect in the activity of a brass catalyst in the hydrogenation of benzene to cyclohexane.

Hydrogenation of benzene to cyclohexane was investigated in a batch reactor. A time varying electric field in the form of a square wave was applied capacitively to a brass surface which served as a catalyst for the hydrogenation reaction. The batch reactor was maintained at 100°±0.1° C. and atmospheric pressure. The extent of the hydrogenation at any time can be monitored by observing the pressure drop in the batch reactor. The average rate of reaction in moles of cyclohexane per unit time between $t$ and $t+\Delta t$ can be computed by using the observed pressure drop, $\Delta p$, in the time interval $\Delta t$ $$\text{rate} = -\frac{V}{(3RT)}\left(\frac{\Delta p}{\Delta t}\right) \quad (1)$$

where, V, T, R are, respectively, the reactor volume, absolute temperature and gas constant.

The total pressure drop in nineteen and one half hours was used to calculate the percentage of conversion of benzene to cyclohexane by the following formula.

$$\text{Percent conversion} = (100(1+x)/3) \cdot |\Delta P/P_i| \quad (2)$$

where $x$ and $P_i$ are, respectively, the molar ratio of hydrogen to benzene in the initial mixture and the initial pressure in the batch reactor.

From Equation 2 it is evident that the calculated percentage conversion reflects also the *average* rate of reaction in nineteen and one half hours. Four series of runs were carried out at the same temperature and pressure condition (i.e., 100° C. and atmospheric pressure). In each series of runs the amplitude of the square wave (i.e., field intensity in volts/cm.) was kept constant, frequencies varied from 10 cycles per second to several hundreds or thousands. Table 2 presents the data of four series of runs which is included here for the purpose of *illustration*. It was observed from each series of runs that there existed a frequency in the neighborhood of which the percentage conversion of benzene to cyclohexane was at the highest "plateau." Under otherwise identical conditions, a 300% rate *enhancement* was observed at relatively low field intensities (100–1000 volts/cm.).

The experimental results indicated that the percentage of conversion of benzene to cyclohexane was a function of both the amplitude and the frequency of the square wave, applied normal to the catalyst surface. The data in Table 2 indicates further that the optimum conversion (and rate of reaction) occurs at still higher field intensities and higher frequencies.

TABLE 2.—HYDROGENATION OF BENZENE TO CYCLOHEXANE DURING 19½ HOURS IN A BATCH REACTOR UNDER THE INFLUENCE OF A SQUARE WAVE ELECTRODYNAMIC FIELD.

| Series | Field (volts/cm.) | Frequency (cy./sec.) | Cyclohexane (vol. percent) |
|---|---|---|---|
| 1 | None | None | 1.64 |
| 1 | None | None | 1.68 |
| 1 | None | None | 1.64 |
| 1 | None | None | 1.74 |
| 2 | 100 | 10 | 1.34 |
| 2 | 100 | 50 | 1.35 |
| 2 | 100 | 150 | 2.35 |
| 2 | 100 | 200 | 0.95 |
| 2 | 100 | 250 | 0.97 |
| 2 | 100 | 100 | 1.17 |
| 2 | 100 | 100 | 1.63 |
| 2 | 100 | 125 | 2.13 |
| 2 | 100 | 150 | 2.47 |
| 2 | 100 | 175 | 1.94 |
| 2 | 100 | 200 | 1.05 |
| 2 | 100 | 250 | 1.06 |
| 3 | 500 | 10 | 1.94 |
| 3 | 500 | 150 | 2.33 |
| 3 | 500 | 500 | 4.09 |
| 3 | 500 | 700 | 4.93 |
| 3 | 500 | 1000 | 1.41 |
| 3 | 500 | 700 | 4.73 |
| 3 | 500 | 1300 | 1.57 |
| 3 | 500 | 400 | 2.75 |
| 3 | 500 | 600 | 3.97 |
| 3 | 500 | 800 | 2.23 |
| 3 | 500 | 900 | 1.46 |
| 4 | 1,000 | 10 | 3.22 |
| 4 | 1,000 | 100 | 3.36 |
| 4 | 1,000 | 300 | 3.72 |
| 4 | 1,000 | 500 | 3.41 |
| 4 | 1,000 | 700 | 4.51 |
| 4 | 1,000 | 900 | 4.32 |
| 4 | 1,000 | 1100 | 4.48 |
| 4 | 1,000 | 1300 | 5.23 |
| 4 | 1,000 | 1500 | 3.48 |
| 4 | 1,000 | 1500 | 3.39 |
| 4 | 1,000 | 1700 | 3.38 |

The above description and examples are intended to be illustrative only. Any modification of or variation therefrom which conforms to the spirit of the invention is intended to be included within the scope of the claims.

I claim:

1. In the process of oxidizing carbon monoxide to carbon dioxide wherein carbon monoxide in the presence of oxygen is contacted with a carbon monoxide oxidation catalyst; the improvement wherein said catalyst simultaneously in subjected to a low frequency electric field.

2. The method, as recited in claim 1, wherein the strength of the electric field varies with time.

3. The method, as recited in claim 1, wherein the strength of the electric field varies sinusoidally with time.

4. The method, as recited in claim 1, wherein the strength of the electric field varies as a square wave function of time.

5. The method, as recited in claim 1, wherein the catalyst is a semiconductor.

6. The method, as recited in claim 1, wherein the catalyst is a metal.

7. The method, as recited in claim 6, wherein the strength of the electric field varies sinusoidally with time.

8. The method, as recited in claim 6, wherein the electric field is a square wave function of time.

References Cited

UNITED STATES PATENTS

| | | | |
|---|---|---|---|
| 3,253,048 | 5/1966 | Cabbage | 260—667 |
| 3,309,411 | 3/1967 | Waldby | 260—667 |
| 3,311,667 | 3/1967 | Cabbage | 260—667 |
| 3,318,965 | 5/1967 | Hutto et al. | 260—667 |
| 3,341,613 | 9/1967 | Hann | 260—667 |
| 3,344,052 | 9/1967 | Yeh | 204—177 |
| 3,367,888 | 2/1968 | Hoekstra | 23—2 |

OTHER REFERENCES

Bluh, O.: Z. Physik, 107, 369, 1937.
Stadnik, P. M., et al.: Kinetika i, Kataliz 5, 430, 1964.

ROBERT K. MIHALEK, Primary Examiner

U.S. Cl. X.R.

204—168; 260—667; 23—150; 252—373